INVENTOR.
DAVID SALZMAN
BY Woodling, Krost,
Granger and Rust
ATTORNEYS

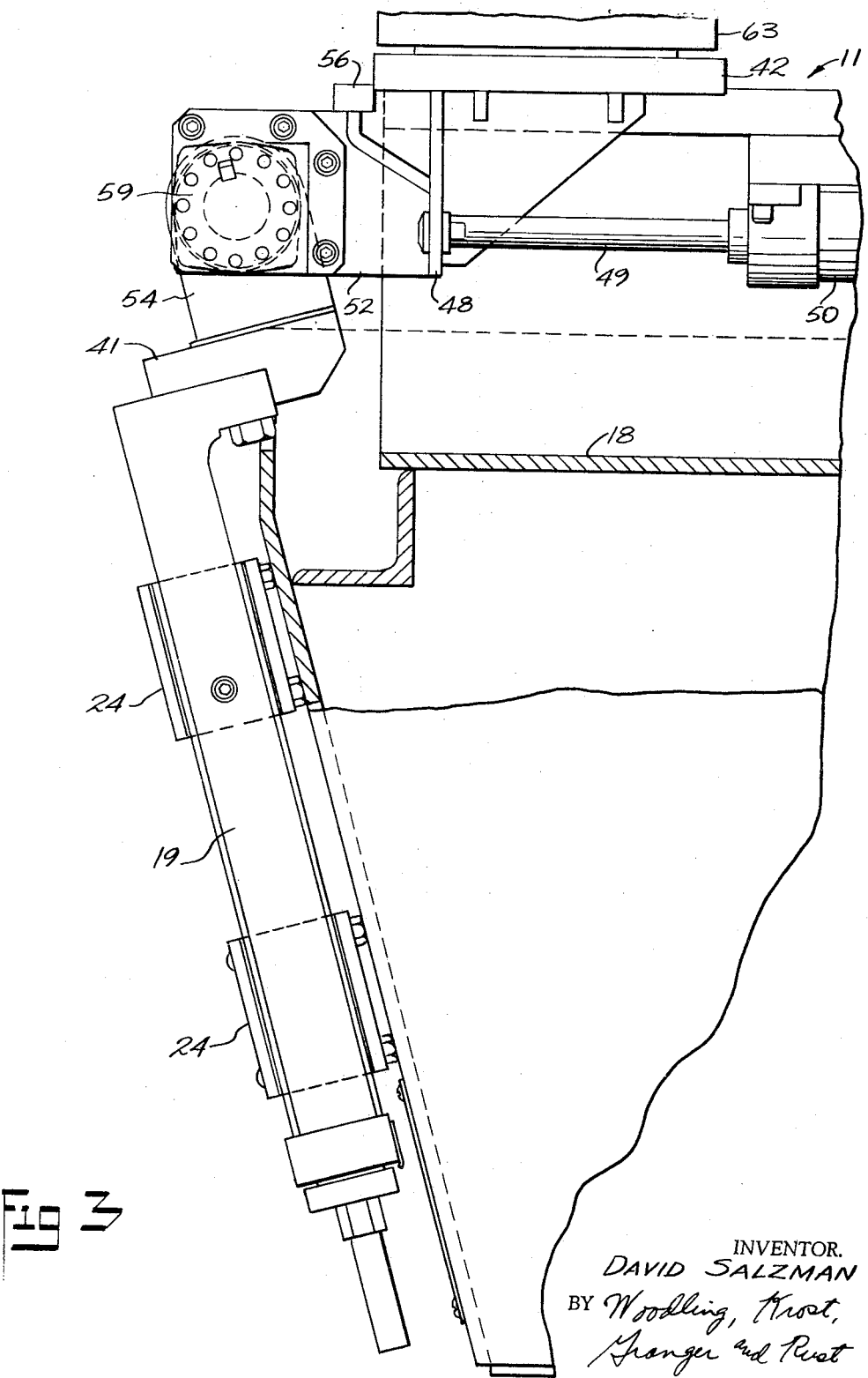

United States Patent Office 3,507,136
Patented Apr. 21, 1970

3,507,136
SPINDLE BEARING SUPPORT
David Salzman, Euclid, Ohio, assignor to Wilson, Lee Engineering Company, a corporation of Ohio
Filed Mar. 13, 1967, Ser. No. 622,635
Int. Cl. B21b 31/08
U.S. Cl. 72—238   18 Claims

ABSTRACT OF THE DISCLOSURE

The disclosure relates to an outboard bearing stand or support for one or two spindles journalled in the bearing support. The bearing stand may be moved parallel to the axis of the spindle to remove the bearing support from the spindle and then the bearing stand is swung through an arc to be out of the way of the first end of the spindle so as to permit ready access to the spindle to remove or replace rolls on the spindle.

SUMMARY OF THE INVENTION

The invention may be incorporated in a machine, comprising, in combination, a frame, a first bearing stand on said frame, a spindle having first and second ends, means journalling said first end of said spindle in said first bearing stand, means journalling said second end of said spindle on said machine, a roll on said spindle for cooperation with a workpiece, means guiding relative movement of said first bearing stand and said spindle substantially parallel to said spindle from a retracted first position journalling the spindle to an extended second position whereat said first bearing stand journal is separated from said spindle, and means guiding relative movement of said first bearing stand and said spindle in a second path different from said first path to expose the first end of said spindle for ready access to the roll thereon.

Accordingly, an object of the invention is to provide a machine with an outboard bearing support for a spindle which support is quickly removable.

Another object of the invention is to provide a quick change roll stand by having an outboard bearing stand quickly movable in first and second paths to remove the bearing stand from the path of the rolls on the spindles.

Another object of the invention is to provide a quick change roll stand which may be used to quickly change the rolls in slitters, roll forming machines, roll sizing machine, re-rolling machines and the like.

Other objects and a fuller understanding of the invention may be had by referring to the following description and claims, taken in conjunction with the accompanying drawings, in which:

FIGURE 3 is an end view similar to FIGURE 2 but showing the bearing stand moved into a quick change position.

Figure 1:
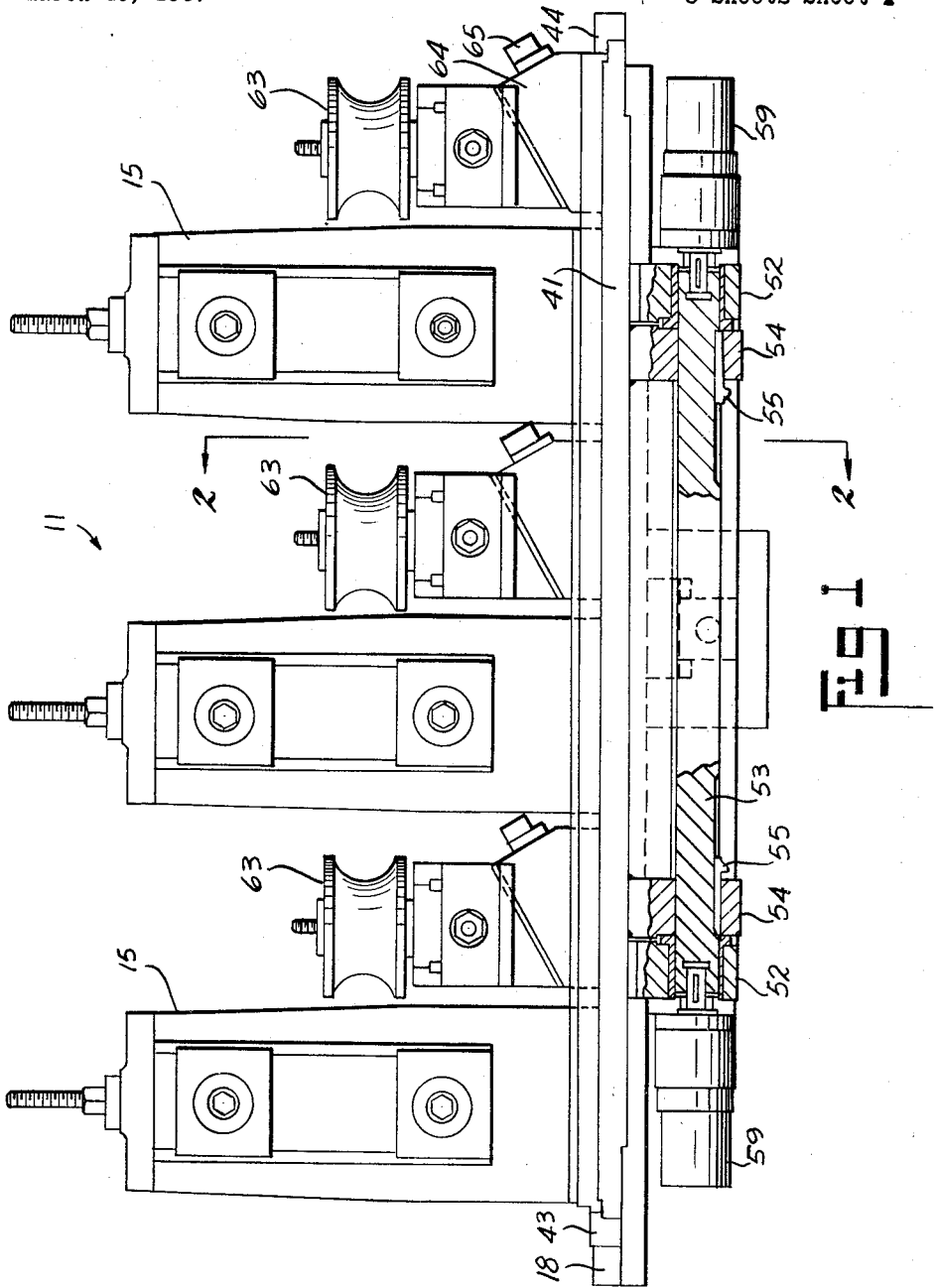
FIGURE 1 is a front elevational view partly in section of a machine incorporating the invention.
Figure 2:
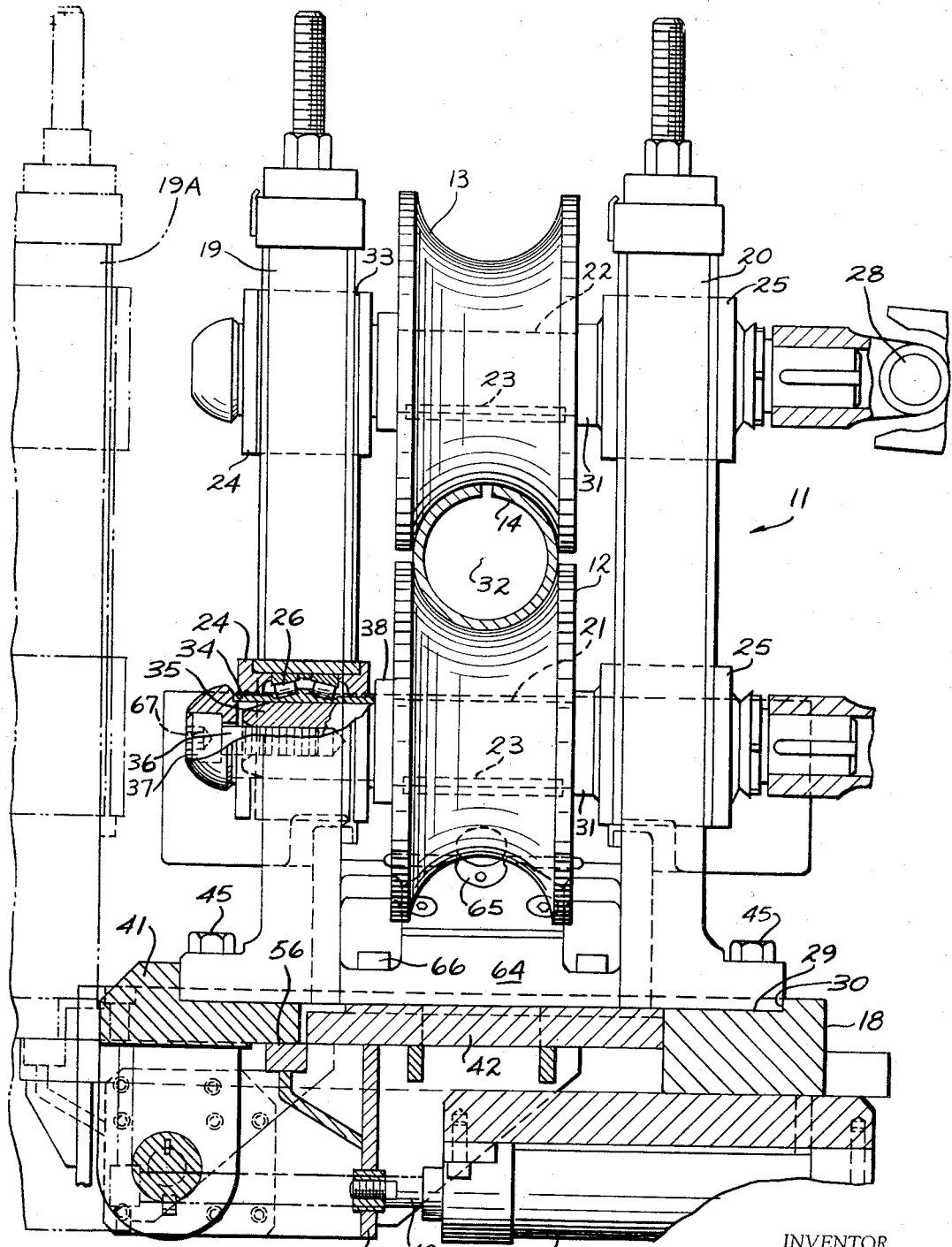
FIGURE 2 is an enlarged end elevational view of one of the roll stands on the machine of FIGURE 1.

The figures of the drawing illustrate a preferred embodiment of the invention as incorporated in a machine 11. This machine is shown as a roll forming machine having rolls 12 and 13 for cooperating with a workpiece 14 in any one of sizing, forming, re-rolling, slitting and the like. The particular shape of the rolls 12 and 13 as shown in the drawing would be suitable for forming or sizing a generally tubular workpiece 14. One or more rolls may be on each spindle and such rolls may be on one and usually several roll stands 15, as best shown in FIGURES 1 and 2, on the machine 11 for progressively forming flat strip into the desired shape.

The machine 11 has a frame 18. FIGURE 1 shows three roll stands 15 on this frame 18 and as viewed in FIGURE 2, each roll stand 15 has first and second bearing stands 19 and 20, respectively. The first bearing stand 19 is disposed closer to the front of the machine 18. The first and second bearing stands journal a first spindle 21. In this preferred embodiment, a second spindle 22 is also journalled in the bearing stands 19 and 20. The rolls 12 and 13 may be keyed to the respective spindles 21 and 22 by keys 23. Each spindle has first and second ends with the first ends disposed closer to the front of the machine frame 18 than the second ends. Journal blocks 24 are vertically slidably disposed in the bearing stand 19 to permit relative vertical adjustment or spacing between the first and second spindles 21 and 22. Journal blocks 25 are also vertically slidably movable in the second bearing stand 20 and these journal blocks 24 and 25 carry antifriction bearings 26 to journal the ends of the spindles 21 and 22.

The spindles 21 and 22 may be driven through universal joints 28 from a power source, not shown. The universal joints permitting powered drive of the spindles 21 and 22 even through the spacing therebetween may be changed because of different diameter rolls 12 and 13. In any given machine 11, for example a roll forming machine, there may be as many as twenty of these roll stands 15 and accordingly it is important to align these roll stands along the longitudinal length of the machine 11 in order to maintain the effective centers of the rolls 12 and 13 along a common axis for all roll stands 15. To this end, each of the rear bearing stands 20 is fixed on the machine frame 18 resting on bearing surfaces 29 and disposed against the bearing surface 30. Also the journal blocks 25 in the rear bearing stand 20 are closely held in the ways thereof for closely guided vertical movement. Shim washers 31 to the rear of the rolls 12 and 13 thus establish the workpiece center 32 in the desired position relative to the longitudinal axis of the machine 11.

The journal blocks 24 in the first bearing stand 19 have a loose fit in the ways of this bearing stand 19 providing a small clearance space 33. The bearing 26 has an inner race 34 which is a sleeve closely surrounding the first end 35 of the spindle 21. A cap screw 36 engages a tapped hole in the first end 35 of the spindle and the head 37 of the cap screw 36 engages the end of the spindle 21 and the end of the bearing inner race 34 to establish the longitudinal position of the roll 13 relative to the spindle 21 and the longitudinal position of the spindle 21 relative to the journal block 24. The inner end of the inner race 34 bears against a shim washer 38. This permits the rolls 12 and 13 to be closely held to establish the longitudinal workpiece axis 32 relative to the machine 11.

The machine frame 18 is provided with first and second plates 41 and 42, respectively. These plates 41 and 42 are slidably guided on the machine frame 18 in ways formed by gibs 43 and 44, best shown in FIGURE 1. This permits the plates 41 and 42 to slide in a direction parallel to the spindles 21 and 22. The first bearing stand 19 is fixedly attached to the first plate 41 by bolts 45, as shown in FIGURE 2, and three such bearing stands 19 have been mounted on the first plate 41, as shown in FIGURE 1. The second plate 42 has a depending bracket 48 to which a piston rod 49 of a fluid motor 50 is attached. The fluid motor 50 is attached to the machine frame 18 to move the second plate 42 along a first path defined by the gibs 43 and 44, which first path is parallel to the spindles 21 and 22. The depending bracket 48 also carries a journal block 52, see FIGURE 1, which journals a transverse shaft 53. Two such journal blocks 52 may be carried on opposite ends of the plate 42 in order to properly journal this transverse shaft 53. Depending brackets 54 are fixed on the first plate 41 at each end of the shaft 53 and are keyed to this shaft by keys 55. With this construction, the first and second plates 41 and 42 are pivotally interconnected at the shaft 53 and the first plate 41 may rest on a bearing surface 56 of the plate 42 to align the plates 41 and 42 in a horizontal plane when in the position shown in solid lines in FIGURE 2. In such position, the plate 41 is aligned to enter the ways provided by the gibs 43 and 44. A motor 59 may be a rotary fluid motor as shown to provide rotation of the first plate 41 relative to the second plate 42. This rotary fluid motor 59 is shown as acting between the transverse shaft 53 and the journal block 52 which is attached to the second plate 42. Rotation of the motor 59 will rotate the first plate 41 and hence rotate the first bearing stand 19 in an arcuate path which may be characterized as a second path.

In the roll forming machine 11, besides the main roll stands 15, side roll stands 63 may be provided. FIGURE 1 shows three such side roll stands, generally spaced between two successive main roll stands 15. These side roll stands may have an angular height adjustment by being mounted on an angular base 64 and movable thereon by an adjusting screw 65. Each of the angular bases 64 is fixed in some suitable manner to the second plate 42, as by the bolts 66.

Operation

In roll forming machines especially, or others wherein many roll stands 15 are in use to form or otherwise perform operations on a workpiece 14, it is often necessary to change the rolls 12 and 13. Job shops, for example, may have many different rolls to roll all manner of workpieces which may be tubing, corrugated metal roofing, metal shapes used for structural members such as angles and U's as an example, and in many cases such users of these machines 11 wish to change the rolls 12 and 13 on the roll stands 15 quite frequently. For a moderate size machine 11 having rolls perhaps six to eight inches in diameter, and twenty such roll stands, it is common in the prior art machines to require about four hours to change these rolls. In such prior art machine it was usual to have to unbolt some means holding the journal blocks 24 in the bearing stand 19. Next the bolts 45 would have to be removed to loosen the bearing stand 19 from the frame of the machine. Next the bearing stand 19 would have to be manually slid forward along the spindles 21 and 22, with the spindles supported in the rear journal blocks 25. Next the rolls 12 and 13 would be removed. The process would then have to be reversed with the new set of rolls slipped onto the spindles and onto the keys 23. The bearing stand 19 with the journal blocks 24 would be slid back onto the spindles 21 and 22. The bolts 45 would than have to be tightened onto the machine frame 18 and the bolts holding the spindles 21 and 22 in longitudinal position relative to the journal blocks 24 and 25 would have to be screwed in and tightened. All this could easily take ten to fifteen minutes per rolls stand or perhaps four hours for an entire machine with twenty roll stands.

In the present machine, the comparable operation can be performed in about one minute per roll stand or less than three minutes per group of three roll stands as shown in FIGURE 1.

The sequence of operation is that the machine operator uses a power operated wrench such as an air operated or electrical operated wrench inserted into a wrench pad 67, such as a hexagonal aperture in the end of the cap screw 36. This readily removes this cap screw 36 from the end of the spindles 21 and 22. Next a button is pushed which energizes a solenoid operated valve, and the fluid motor 50 is moved from the first or retracted position of FIGURE 2 to a second extended position shown in phantom lines. Next the rotary fluid motor 59 is actuated, as by a limit switch, and this rotates the first plate 41 in the order of 180 degrees to the position shown in FIGURE 3. Actually this may be about 190 degrees to move the first bearing stand 19 arcuately down out of the way to expose the end of the spindles 21 and 22. The rolls 12 and 13 are then exposed and may then be freely pulled off the spindles 21 and 22.

The gibs 43 and 44 provide translatory movement for the plates 41 and 42. The second plate 42 is directly moved by the fluid motor 50 and through the connection of the transverse shaft 53, this also moves the first plate 41 in a first path from a first retracted position to a second extended position. Such second position is shown in phantom lines 19A in FIGURE 2 with this bearing stand moved toward the front of the machine 11. In such second position, the journal blocks 24 will have been removed from the first ends of the spindles 21 and 22. Also in such second position, the first plate 41 will be removed from confinement between the gibs 43 and 44. Accordingly, as the first plate 41 reaches this second position, it may actuate a limit switch to stop movement of the fluid motor 50 and to initiate movement of the rotary fluid motor 59. This will then move the first plate 41 and the bearing stand 19 through the arcuate second path from the phantom line position of FIGURE 2, to the full line position of FIGURE 3. Thus the rolls 12 and 13 are completely exposed and an operator may readily remove these rolls from the spindles 21 and 22. The rolls may be replaced by others and the sequence of operation reversed by pressing a second button which will cause the rotary fluid motor 59 to move in a reverse arcuate direction back to the phantom line position of FIGURE 2 whereupon rotation of this motor 59 will cease and movement of fluid motor 50 will be actuated to retract it to the solid line position shown in FIGURE 2. During this retraction movement along the first path, the first bearing stand 19 will be moved toward the rear of the machine 11 and the bearings 26 in the journal blocks 24 will slide onto the ends of the spindles 21 and 22. The cap screws 36 may then be replaced by the power wrench. The machine 11 is then perfectly aligned because the workpiece center 32 has not been disturbed, it is still maintained by the second bearing stand 20 being fixed to the frame 18 on the bearing surfaces 29 and 30.

The rotary fluid motor 59 may be controlled by a solenoid operated valve, for example, and may be an oil type of fluid gear motor. Thus when this motor 59 is deenergized by closing of the valve, it is effectively locked in rotational position and a force on the bearing stand 19 will not rotate this motor 59. This is advantageous in the return movement of the bearing stand from the position shown in FIGURE 3 to the solid line position shown in FIGURE 2. During this return movement when the bearing stand 19 is in the phantom line position 19A, the rotary fluid motor 59 is deenergized and thus the plate 41 is effectively locked rotatively so that it may enter between the gibs 43 and 44.

When the bearing stand 19 is in the forward and downward position of FIGURE 3, it will also be noted that the second plate 42 has moved to the front of the machine 11. This moves the side roll stands 63 to the front of the machine whereat they are at a most convenient position for ready removal of the rolls thereon.

The first path of movement of the first bearing stand 19 is parallel to the spindles 21 and 22 in order to provide relative movement of this bearing stand 19 and the spindles 21 to separate same. The second path of movement of the bearing stand 19 is a relative movement between this bearing stand and the spindles 21 and 22 to relatively remove the bearing stand 19 from the front end of the spindles. This second path is different from, namely at an angle to, the first path. This second path is caused to be different from the first path by the transverse shaft 53 which shaft is displaced from the space bounded by the first and second spindles 21 and 22, in order that the first bearing stand 19 may be physically removed from in front of the front ends of these spindles.

It will be noted that in FIGURE 3 the only support for the first plate 41 is through the transverse shaft 53 and the second plate 42 to the machine frame 18. It is this pivotal interconnection between the first and second plates 41 and 42 which permits the first plate 41 to first translate toward the front of the machine 11 and next to arcuately move in the second path.

The second plate 42 may be considered a second member movable on the machine frame parallel to the first path. The first plate 41 may be considered a first member movable on the machine frame parallel to the first path and to the second path. The transverse shaft 53 interconnects the first and second members to have the first bearing stand 19 moved sequentially in the first and second paths and wherein the first bearing stand 19 is connected to the machine frame only by the linkage of the first member or plate 41, the transverse shaft 53 and the second plate 42, sliding in the gibs 43 and 44.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:

1. A machine, comprising, in combination, a frame, a first bearing stand on said frame, a spindle having first and second ends, means journalling said first end of said spindle in said first bearing stand, means journalling said second end of said spindle on said machine, a roll on said spindle for cooperation with a workpiece, means guiding relative movement between said first bearing stand and said spindle in a first path on said frame substantially parallel to said spindle from a retracted first position journalling the spindle to an extended second position whereat said first bearing stand journal is separated from said spindle, means guiding relative movement between said first bearing stand and said spindle in a second path different from said first path to expose the first end of said spindle for ready access to the roll thereon, said guiding means including a first member movable on said machine frame in said second path, a second member separate from said first member movable on said machine frame parallel to said first path, means mounting said first bearing stand on said first member, and means interconnecting said first and second members to have said first bearing stand moved sequentially in said first and second paths.

2. A machine as set forth in claim 1 including a second spindle journalled in said first bearing stand and on said machine, and a second roll on said second spindle for co-operation with the first roll and a workpiece.

3. A machine as set forth in claim 2, wherein said first bearing stand moves generally parallel to said spindles in said first path and moves at an angle to said first path in said second path to expose one end of the two spindles.

4. A machine as set forth in claim 1 wherein said machine frame has a front, and said relative movement in said first path moves said first bearing stand toward said machine frame front for better access to the roll on the spindle.

5. A machine as set forth in claim 1 wherein said relative movement in said second path is a movement of said first bearing stand away from said first end of said spindle.

6. A machine as set forth in claim 1 wherein said frame has a front, said first bearing stand translates in said first path toward the front of the machine frame, and said first bearing stand moves arcuately in said second path to expose the first end of said spindle.

7. A machine as set forth in claim 1 wherein said first bearing stand is connected to said machine frame only through said first member, said interconnecting means and said second member.

8. A machine as set forth in claim 1 including an additional roll spindle journalled on said first member to expose an end of said additional spindle as said first member is moved along said first path toward the front of the machine frame for ready access to the roll thereon.

9. A machine as set forth in claim 1 including a first plate in said first member, and means slidably journalling said first plate on said frame in said first path.

10. A machine as set forth in claim 9 including a transverse shaft movable with said first plate, and means including pivotal connection means connecting said transverse shaft to said machine frame to pivotally move said first plate in an arcuate second path.

11. A machine as set forth in claim 10 including a second spindle journalled in said first bearing stand and on said machine and parallel to said first spindle, a second roll on said second spindle for cooperation with a workpiece and with the first roll, and wherein said transverse shaft is carried on said machine in a position displaced from the space bounded by said first and second spindles.

12. A machine as set forth in claim 9 including a second plate in said second member, gibs slidably journalling said first and second plates in said first path on said machine, a transverse shaft pivotally interconnecting said first and second plates, said second position of said first bearing stand in said first path establishing said second plate within said gibs and establishing said first plate as removed from said gibs, the removal of said first plate from said gibs permitting arcuate movement of said first plate in said second path as pivotally connected to said second plate by the pivotal connection on said transverse shaft.

13. A machine as set forth in claim 12 wherein said first bearing stand moves forwardly and downwardly in said second path in the order of 180 degrees to be removed from the area of said spindle first end for ready removal of said roll.

14. A machine as set forth in claim 1 including means to establish the longitudinal position of said spindle relative to the journal therefor in said first bearing stand.

15. A machine as set forth in claim 14 wherein said longitudinal positioning means includes a single screw for said spindle axially engaging said spindle and said journal.

16. A machine as set forth in claim 1 including motor means connected to move said first bearing stand in said first path and in said second path.

17. A machine as set forth in claim 1 including first and second motors connected to move said first bearing stand in said first and second paths, respectively, each said motor having energized and deenergized conditions, and said second motor in said deenergized condition being substantially locked against movement to substantially lock said first bearing stand against attempted movement in said second path until energization of said second motor.

18. A machine as set forth in claim 1, wherein said interconnecting means includes a transverse pivotal interconnection to cause said first member to move in an arcuate second path.

References Cited

UNITED STATES PATENTS

| | | | |
|---|---|---|---|
| 1,089,126 | 3/1914 | Grey | 72—238 |
| 2,176,115 | 10/1939 | Yoder | 72—181 |
| 3,298,215 | 1/1967 | Bonhoff | 72—238 |
| 3,425,256 | 2/1969 | McGoogan et al. | 72—239 |

RICHARD J. HERBST, Primary Examiner

B. J. MUSTAIKIS, Assistant Examiner